United States Patent
Krall et al.

(10) Patent No.: US 10,178,738 B2
(45) Date of Patent: Jan. 8, 2019

(54) INTELLIGENT DIMMING LIGHTING

(71) Applicant: Universal Display Corporation, Ewing, NJ (US)

(72) Inventors: Emory Krall, Philadelphia, PA (US); Ruiqing Ma, Morristown, NJ (US); Michael Hack, Princeton, NJ (US); Eoin Billings, London (GB); Duncan Jackson, Chicago, IL (US)

(73) Assignee: Universal Display Corporation, Ewing, NJ (US)

( * ) Notice: Subject to any disclaimer, the term of this patent is extended or adjusted under 35 U.S.C. 154(b) by 0 days.

(21) Appl. No.: 15/180,229

(22) Filed: Jun. 13, 2016

(65) Prior Publication Data

US 2016/0295666 A1    Oct. 6, 2016

Related U.S. Application Data (62) Division of application No. 14/015,526, filed on Aug. 30, 2013, now Pat. No. 9,374,872.

(51) Int. Cl.
*H05B 37/02* (2006.01)
*H05B 33/08* (2006.01)

(52) U.S. Cl.
CPC ..... *H05B 37/0227* (2013.01); *H05B 33/0872* (2013.01); *H05B 33/0884* (2013.01); *H05B 33/0896* (2013.01); *H05B 37/0218* (2013.01); *H05B 37/0272* (2013.01); *Y02B 20/46* (2013.01); *Y02B 20/48* (2013.01)

(58) Field of Classification Search
CPC ............ H05B 33/0872; H05B 37/0218; H05B 37/0227; H05B 37/0272; H05B 37/029

USPC .......................................................... 315/312
See application file for complete search history.

(56) References Cited

U.S. PATENT DOCUMENTS

| 4,769,292 | A | 9/1988 | Tang et al. |
| 5,247,190 | A | 9/1993 | Friend et al. |
| 5,703,436 | A | 12/1997 | Forrest et al. |

(Continued)

FOREIGN PATENT DOCUMENTS

| WO | 2008057394 | 5/2008 |
| WO | 2010011390 | 1/2010 |

OTHER PUBLICATIONS

Baldo, et al., "Highly efficient phosphorescent emission from organic electroluminescent devices", Nature, vol. 395, pp. 151-154, 1998.

(Continued)

*Primary Examiner* — Tung X Le
(74) *Attorney, Agent, or Firm* — Morris & Kamlay LLP (57) ABSTRACT

Systems, devices, and techniques are provided for operating a display and/or an illumination source based upon the direction of a user's gaze and/or a desired illumination level in a monitored area. One or more elements may be controlled with sensor input and application lighting preferences. For example, when a user receives a video call, light may be activated to illuminate their face. When the user is looking at the display, the display will be at the brightness necessary for the lighting conditions. When the user looks away from the screen, the screen may dim further and the lighting elements for the desk can brighten. Similarly, embodiments may adjust the lighting in a monitored location based upon lighting levels identified in other areas.

13 Claims, 9 Drawing Sheets

(56) References Cited

U.S. PATENT DOCUMENTS

| | | | |
|---|---|---|---|
| 5,707,745 A | 1/1998 | Forrest et al. | |
| 5,834,893 A | 11/1998 | Bulovic et al. | |
| 5,835,083 A | 11/1998 | Glass et al. | |
| 5,844,363 A | 12/1998 | Gu et al. | |
| 6,013,982 A | 1/2000 | Thompson et al. | |
| 6,087,196 A | 7/2000 | Sturm et al. | |
| 6,091,195 A | 7/2000 | Forrest et al. | |
| 6,097,147 A | 8/2000 | Baldo et al. | |
| 6,294,398 B1 | 9/2001 | Kim et al. | |
| 6,303,238 B1 | 10/2001 | Thompson et al. | |
| 6,337,102 B1 | 1/2002 | Forrest et al. | |
| 6,468,819 B1 | 10/2002 | Kim et al. | |
| 6,734,845 B1 | 5/2004 | Nielsen et al. | |
| 7,279,704 B2 | 10/2007 | Walters et al. | |
| 7,431,968 B1 | 10/2008 | Shtein et al. | |
| 7,968,146 B2 | 6/2011 | Wagner et al. | |
| 8,687,840 B2 | 4/2014 | Samanta et al. | |
| 8,825,020 B2 | 9/2014 | Mozer et al. | |
| 9,072,130 B2 | 6/2015 | Tamami | |
| 2003/0230980 A1 | 12/2003 | Forrest et al. | |
| 2004/0174116 A1 | 9/2004 | Lu et al. | |
| 2004/0175020 A1 | 9/2004 | Bradski et al. | |
| 2005/0199783 A1 | 9/2005 | Wenstrand et al. | |
| 2008/0111833 A1 | 5/2008 | Thorn et al. | |
| 2010/0079508 A1 | 4/2010 | Hodge et al. | |
| 2012/0019168 A1* | 1/2012 | Noda | H05B 37/0227 315/307 |
| 2012/0080944 A1* | 4/2012 | Recker | H02J 9/02 307/25 |
| 2012/0105490 A1 | 5/2012 | Pasquero et al. | |
| 2013/0231796 A1* | 9/2013 | Lu | H04L 12/2807 700/295 |
| 2014/0042911 A1* | 2/2014 | Noguchi | G01J 1/00 315/152 |
| 2014/0280316 A1* | 9/2014 | Ganick | G06F 17/30522 707/769 |
| 2014/0340334 A1* | 11/2014 | Cho | G06F 3/013 345/173 |
| 2015/0002554 A1* | 1/2015 | Kupershmidt | G09G 3/3208 345/690 |
| 2015/0130373 A1* | 5/2015 | Van De Sluis | G08C 17/02 315/308 |

OTHER PUBLICATIONS

Baldo, et al., "Very high-efficiency green organic light-emitting devices based on electrophosphorescence", Applied Physics Letters, vol. 75, No. 1, pp. 4-6, Jul. 5, 1999.

* cited by examiner

INTELLIGENT DIMMING LIGHTING

The claimed invention was made by, on behalf of, and/or in connection with one or more of the following parties to a joint university corporation research agreement: Regents of the University of Michigan, Princeton University, The University of Southern California, and the Universal Display Corporation. The agreement was in effect on and before the date the claimed invention was made, and the claimed invention was made as a result of activities undertaken within the scope of the agreement.

FIELD OF THE INVENTION

The present invention relates to intelligent dimming lights and lighting systems and, more specifically, to lighting systems that include OLED illumination sources.

BACKGROUND

Opto-electronic devices that make use of organic materials are becoming increasingly desirable for a number of reasons. Many of the materials used to make such devices are relatively inexpensive, so organic opto-electronic devices have the potential for cost advantages over inorganic devices. In addition, the inherent properties of organic materials, such as their flexibility, may make them well suited for particular applications such as fabrication on a flexible substrate. Examples of organic opto-electronic devices include organic light emitting devices (OLEDs), organic phototransistors, organic photovoltaic cells, and organic photodetectors. For OLEDs, the organic materials may have performance advantages over conventional materials. For example, the wavelength at which an organic emissive layer emits light may generally be readily tuned with appropriate dopants.

OLEDs make use of thin organic films that emit light when voltage is applied across the device. OLEDs are becoming an increasingly interesting technology for use in applications such as flat panel displays, illumination, and backlighting. Several OLED materials and configurations are described in U.S. Pat. Nos. 5,844,363, 6,303,238, and 5,707,745, which are incorporated herein by reference in their entirety.

One application for phosphorescent emissive molecules is a full color display. Industry standards for such a display call for pixels adapted to emit particular colors, referred to as "saturated" colors. In particular, these standards call for saturated red, green, and blue pixels. Color may be measured using CIE coordinates, which are well known to the art.

One example of a green emissive molecule is tris(2-phenylpyridine) iridium, denoted Ir(ppy)$_3$, which has the following structure:

In this, and later figures herein, we depict the dative bond from nitrogen to metal (here, Ir) as a straight line.

As used herein, the term "organic" includes polymeric materials as well as small molecule organic materials that may be used to fabricate organic opto-electronic devices. "Small molecule" refers to any organic material that is not a polymer, and "small molecules" may actually be quite large. Small molecules may include repeat units in some circumstances. For example, using a long chain alkyl group as a substituent does not remove a molecule from the "small molecule" class. Small molecules may also be incorporated into polymers, for example as a pendent group on a polymer backbone or as a part of the backbone. Small molecules may also serve as the core moiety of a dendrimer, which consists of a series of chemical shells built on the core moiety. The core moiety of a dendrimer may be a fluorescent or phosphorescent small molecule emitter. A dendrimer may be a "small molecule," and it is believed that all dendrimers currently used in the field of OLEDs are small molecules.

As used herein, "top" means furthest away from the substrate, while "bottom" means closest to the substrate. Where a first layer is described as "disposed over" a second layer, the first layer is disposed further away from substrate. There may be other layers between the first and second layer, unless it is specified that the first layer is "in contact with" the second layer. For example, a cathode may be described as "disposed over" an anode, even though there are various organic layers in between.

As used herein, "solution processible" means capable of being dissolved, dispersed, or transported in and/or deposited from a liquid medium, either in solution or suspension form.

A ligand may be referred to as "photoactive" when it is believed that the ligand directly contributes to the photoactive properties of an emissive material. A ligand may be referred to as "ancillary" when it is believed that the ligand does not contribute to the photoactive properties of an emissive material, although an ancillary ligand may alter the properties of a photoactive ligand.

As used herein, and as would be generally understood by one skilled in the art, a first "Highest Occupied Molecular Orbital" (HOMO) or "Lowest Unoccupied Molecular Orbital" (LUMO) energy level is "greater than" or "higher than" a second HOMO or LUMO energy level if the first energy level is closer to the vacuum energy level. Since ionization potentials (IP) are measured as a negative energy relative to a vacuum level, a higher HOMO energy level corresponds to an IP having a smaller absolute value (an IP that is less negative). Similarly, a higher LUMO energy level corresponds to an electron affinity (EA) having a smaller absolute value (an EA that is less negative). On a conventional energy level diagram, with the vacuum level at the top, the LUMO energy level of a material is higher than the HOMO energy level of the same material. A "higher" HOMO or LUMO energy level appears closer to the top of such a diagram than a "lower" HOMO or LUMO energy level.

As used herein, and as would be generally understood by one skilled in the art, a first work function is "greater than" or "higher than" a second work function if the first work function has a higher absolute value. Because work functions are generally measured as negative numbers relative to vacuum level, this means that a "higher" work function is more negative. On a conventional energy level diagram, with the vacuum level at the top, a "higher" work function is illustrated as further away from the vacuum level in the downward direction. Thus, the definitions of HOMO and LUMO energy levels follow a different convention than work functions.

More details on OLEDs, and the definitions described above, can be found in U.S. Pat. No. 7,279,704, which is incorporated herein by reference in its entirety.

SUMMARY OF THE INVENTION

Embodiments of the invention provide luminaires, lighting systems, and related systems and techniques that allow for control of illumination of one or more areas. In an embodiment, a system may include a display; an illumination source; a gaze direction sensor such as a camera; and at least one controller in communication with the display and the illumination source, which is configured to control of at least one of the display and the general illumination source based upon a signal received from the gaze direction sensor. The controller also may be configured to control each of the display and the general illumination source based upon the signal. The controller also may be configured to control the display at a different rate of change than the general illumination source, and/or each of the display and the general illumination source may be configured to change state at a different rate, in response to an instruction from the controller. In an embodiment, the illumination source may be transparent, flexible, or both transparent and flexible.

The illumination source may be, for example, an organic light emitting device. Various components may be physically grouped or integrated. For example, the electronic device may include both a display and a gaze direction sensor, and the second electronic device may include the illumination source and the controller. As another example, the display, the illumination source, the gaze direction sensor, and the controller are disposed in a single physical device, or each of the display, the illumination source, the gaze direction sensor, and the controller may be a physically separate device. Each component may communicate wirelessly with any other component in the system. More specifically, the controller may be in wireless communication with the display, the illumination device, the gaze direction sensor, or combinations thereof.

The system may include one or more general-purpose computers, such as mobile computing devices including smartphones, tablets, or the like, and one or more luminaires, where the general-purpose computer(s) include the display and the gaze direction sensor, and the lamp comprises the illumination source. The general-purpose computer also may include the controller.

In an embodiment, multiple illumination device are capable of being controlled by the at least one controller.

In an embodiment, one or more illumination sources may be color-tunable, and the controller may be configured to control the color of light emitted by the illumination source in response to the signal.

In an embodiment, the at least one controller is configured to control the color temperature of a white point of the display in response to the signal.

In an embodiment, a luminaire includes a communication module configured to receive a signal from an external device, which indicates a direction of a gaze of a user; an illumination source; and a controller configured to control the illumination source based upon the signal. The luminaire also may include a sensor, configured to determine the gaze of the user. The illumination source may include an organic light emitting device.

In an embodiment, a device includes a gaze direction sensor configured to determine a gaze direction of a user; and a controller configured to control an external illumination source based upon the gaze direction, where the external illumination source is physically separate from the device.

In an embodiment, a device may include a display; a gaze direction sensor configured to determine a gaze direction of a user; and a communication module configured to send a signal to an illumination source, where the signal indicating the gaze direction. The illumination source may be physically distinct from the display. The device may be a portable computing device. The illumination source may be physically attached to the display, and may be configurable in a collapsed or expanded state.

In an embodiment, a system may include a local illumination source; a general room illumination source; a light sensor configured to measure a level of illumination in a region; an da controller configured to receive a signal from the light sensor, and to control at least one of the local illumination source and the general room illumination source based upon the signal, to produce a selected illumination level in the region. The light sensor may be physically separate from the local illumination source and from the general room illumination source. The light sensor may include essentially a solar cell, a wireless transmitter, and circuitry configured to provide a level of detected illumination via the wireless transmitter.

In an embodiment, a controller may be configured to adjust the general room illumination source such that, when a local illumination source is on, the general illumination source is operated at a level that is not more than 50% of the illumination intensity at which it is operated when the local illumination source is off.

In an embodiment, the controller may be configured to adjust the general room illumination source such that, when the local illumination source is on, the energy consumption of the overall system is less than 50% of the energy consumption of the overall system compared to when the local illumination source is off.

In an embodiment, the controller may be configured to adjust the general room illumination source such that, when the local illumination source is on, the energy consumption of the overall system is less than 30% of the energy consumption of the overall system compared to when the local illumination source is off. The local illumination source may have a peak intensity <5,000 $cd/m^2$ at any point on its emitting surface.

In an embodiment, an indication of a gaze direction of a user may be received from a gaze direction sensor, and a general illumination source may be controlled based upon the indication of the gaze direction. Similarly, a display may be controlled based upon the indication of the gaze direction. It may be controlled at the same as, or at a different rate as the general illumination source.

DETAILED DESCRIPTION

Generally, an OLED comprises at least one organic layer disposed between and electrically connected to an anode and a cathode. When a current is applied, the anode injects holes and the cathode injects electrons into the organic layer(s). The injected holes and electrons each migrate toward the oppositely charged electrode. When an electron and hole localize on the same molecule, an "exciton," which is a localized electron-hole pair having an excited energy state, is formed. Light is emitted when the exciton relaxes via a photoemissive mechanism. In some cases, the exciton may be localized on an excimer or an exciplex. Non-radiative mechanisms, such as thermal relaxation, may also occur, but are generally considered undesirable.

The initial OLEDs used emissive molecules that emitted light from their singlet states ("fluorescence") as disclosed, for example, in U.S. Pat. No. 4,769,292, which is incorporated by reference in its entirety. Fluorescent emission generally occurs in a time frame of less than 10 nanoseconds.

More recently, OLEDs having emissive materials that emit light from triplet states ("phosphorescence") have been demonstrated. Baldo et al., "Highly Efficient Phosphorescent Emission from Organic Electroluminescent Devices," Nature, vol. 395, 151-154, 1998; ("Baldo-I") and Baldo et al., "Very high-efficiency green organic light-emitting devices based on electrophosphorescence," Appl. Phys. Lett., vol. 75. No. 3, 4-6 (1999) ("Baldo-II"), which are incorporated by reference in their entireties. Phosphorescence is described in more detail in U.S. Pat. No. 7,279,704 at cols. 5-6, which are incorporated by reference.

Figure 1:
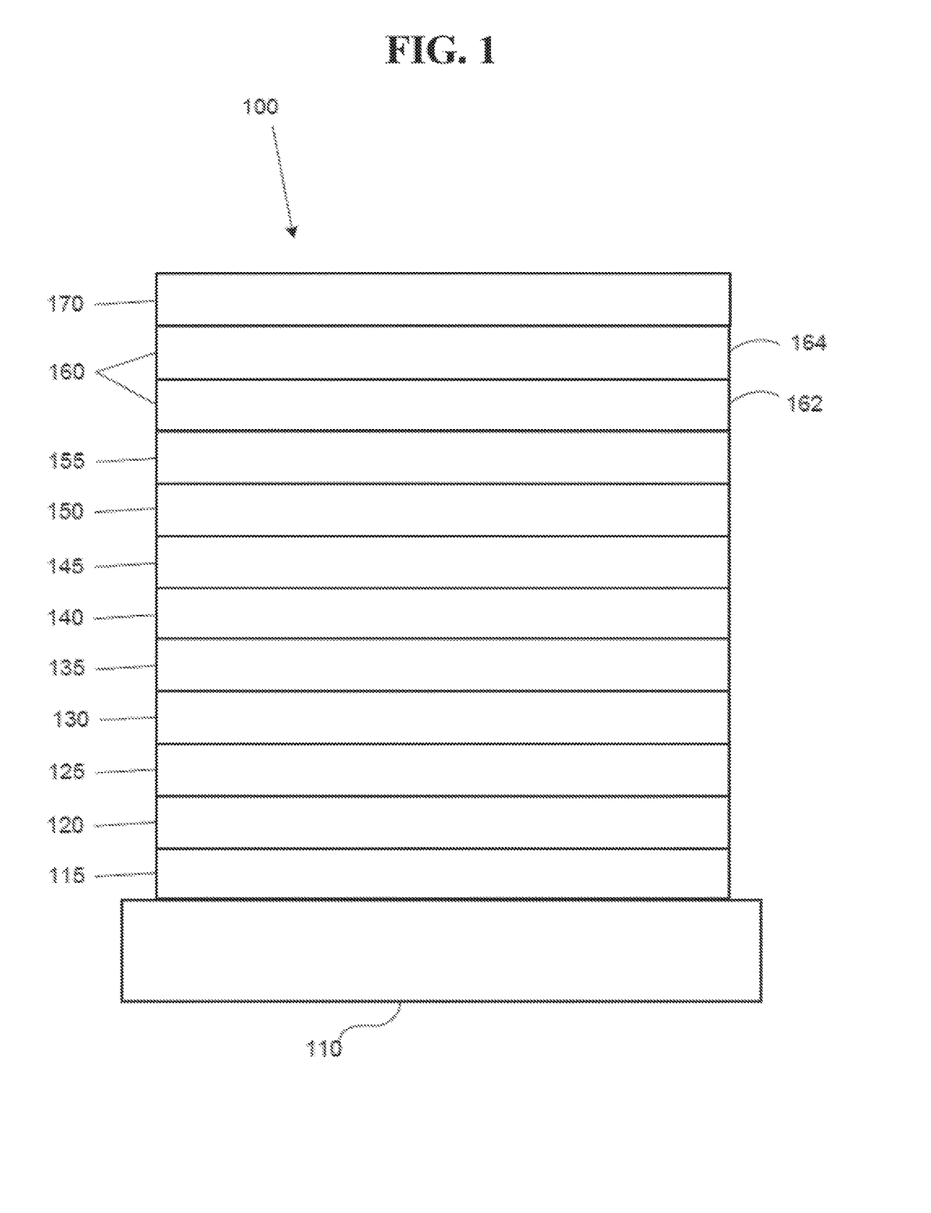
FIG. 1 shows an organic light emitting device.

FIG. 1 shows an organic light emitting device 100. The figures are not necessarily drawn to scale. Device 100 may include a substrate 110, an anode 115, a hole injection layer 120, a hole transport layer 125, an electron blocking layer 130, an emissive layer 135, a hole blocking layer 140, an electron transport layer 145, an electron injection layer 150, a protective layer 155, a cathode 160, and a barrier layer 170. Cathode 160 is a compound cathode having a first conductive layer 162 and a second conductive layer 164. Device 100 may be fabricated by depositing the layers described, in order. The properties and functions of these various layers, as well as example materials, are described in more detail in U.S. Pat. No. 7,279,704 at cols. 6-10, which are incorporated by reference.

More examples for each of these layers are available. For example, a flexible and transparent substrate-anode combination is disclosed in U.S. Pat. No. 5,844,363, which is incorporated by reference in its entirety. An example of a p-doped hole transport layer is m-MTDATA doped with $F_4$-TCNQ at a molar ratio of 50:1, as disclosed in U.S. Patent Application Publication No. 2003/0230980, which is incorporated by reference in its entirety. Examples of emissive and host materials are disclosed in U.S. Pat. No. 6,303,238 to Thompson et al., which is incorporated by reference in its entirety. An example of an n-doped electron transport layer is BPhen doped with Li at a molar ratio of 1:1, as disclosed in U.S. Patent Application Publication No. 2003/0230980, which is incorporated by reference in its entirety. U.S. Pat. Nos. 5,703,436 and 5,707,745, which are incorporated by reference in their entireties, disclose examples of cathodes including compound cathodes having a thin layer of metal such as Mg:Ag with an overlying transparent, electrically-conductive, sputter-deposited ITO layer. The theory and use of blocking layers is described in more detail in U.S. Pat. No. 6,097,147 and U.S. Patent Application Publication No. 2003/0230980, which are incorporated by reference in their entireties. Examples of injection layers are provided in U.S. Patent Application Publication No. 2004/0174116, which is incorporated by reference in its entirety. A description of protective layers may be found in U.S. Patent Application Publication No. 2004/0174116, which is incorporated by reference in its entirety.

Figure 2:
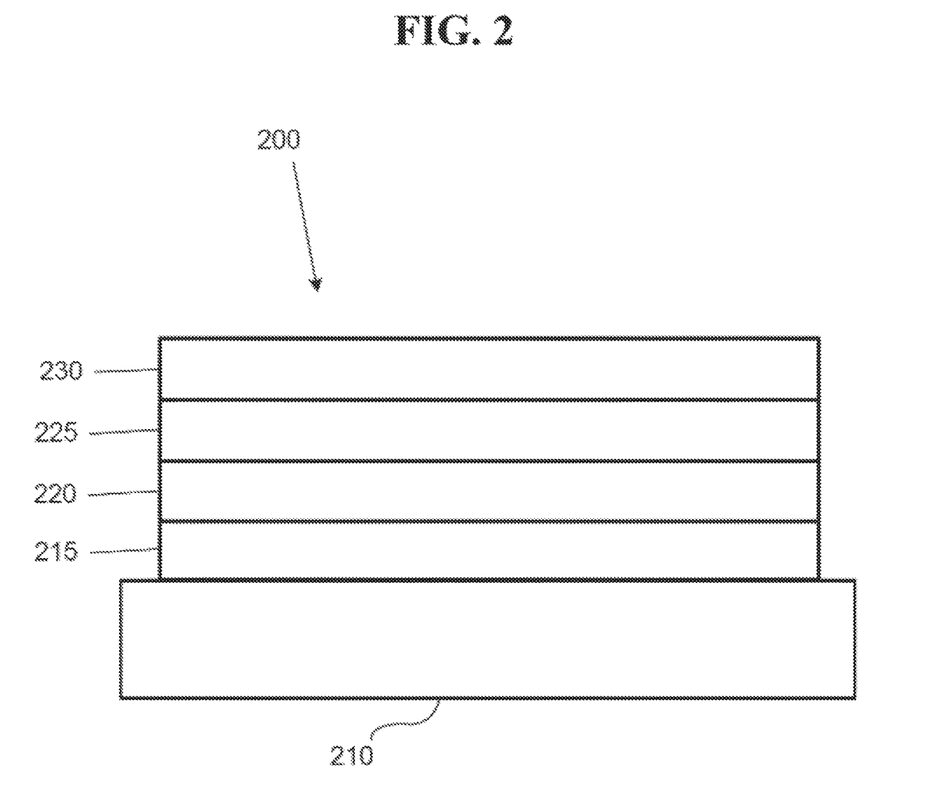
FIG. 2 shows an inverted organic light emitting device that does not have a separate electron transport layer.

FIG. 2 shows an inverted OLED 200. The device includes a substrate 210, a cathode 215, an emissive layer 220, a hole transport layer 225, and an anode 230. Device 200 may be fabricated by depositing the layers described, in order. Because the most common OLED configuration has a cathode disposed over the anode, and device 200 has cathode 215 disposed under anode 230, device 200 may be referred to as an "inverted" OLED. Materials similar to those described with respect to device 100 may be used in the corresponding layers of device 200. FIG. 2 provides one example of how some layers may be omitted from the structure of device 100.

The simple layered structure illustrated in FIGS. 1 and 2 is provided by way of non-limiting example, and it is understood that embodiments of the invention may be used in connection with a wide variety of other structures. The specific materials and structures described are exemplary in nature, and other materials and structures may be used. Functional OLEDs may be achieved by combining the various layers described in different ways, or layers may be omitted entirely, based on design, performance, and cost factors. Other layers not specifically described may also be included. Materials other than those specifically described may be used. Although many of the examples provided herein describe various layers as comprising a single material, it is understood that combinations of materials, such as a mixture of host and dopant, or more generally a mixture, may be used. Also, the layers may have various sublayers. The names given to the various layers herein are not intended to be strictly limiting. For example, in device 200, hole transport layer 225 transports holes and injects holes into emissive layer 220, and may be described as a hole transport layer or a hole injection layer. In one embodiment, an OLED may be described as having an "organic layer" disposed between a cathode and an anode. This organic layer may comprise a single layer, or may further comprise multiple layers of different organic materials as described, for example, with respect to FIGS. 1 and 2.

Structures and materials not specifically described may also be used, such as OLEDs comprised of polymeric materials (PLEDs) such as disclosed in U.S. Pat. No. 5,247,190 to Friend et al., which is incorporated by reference in its entirety. By way of further example, OLEDs having a single organic layer may be used. OLEDs may be stacked, for example as described in U.S. Pat. No. 5,707,745 to Forrest et al, which is incorporated by reference in its entirety. The OLED structure may deviate from the simple layered structure illustrated in FIGS. 1 and 2. For example, the substrate may include an angled reflective surface to improve outcoupling, such as a mesa structure as described in U.S. Pat. No. 6,091,195 to Forrest et al., and/or a pit structure as described in U.S. Pat. No. 5,834,893 to Bulovic et al., which are incorporated by reference in their entireties.

Unless otherwise specified, any of the layers of the various embodiments may be deposited by any suitable method. For the organic layers, preferred methods include thermal evaporation, ink-jet, such as described in U.S. Pat. Nos. 6,013,982 and 6,087,196, which are incorporated by reference in their entireties, organic vapor phase deposition (OVPD), such as described in U.S. Pat. No. 6,337,102 to Forrest et al., which is incorporated by reference in its entirety, and deposition by organic vapor jet printing (OVJP), such as described in U.S. Pat. No. 7,431,968, which is incorporated by reference in its entirety. Other suitable deposition methods include spin coating and other solution based processes. Solution based processes are preferably carried out in nitrogen or an inert atmosphere. For the other layers, preferred methods include thermal evaporation. Preferred patterning methods include deposition through a mask, cold welding such as described in U.S. Pat. Nos. 6,294,398 and 6,468,819, which are incorporated by reference in their entireties, and patterning associated with some of the deposition methods such as ink-jet and OVJP. Other methods may also be used. The materials to be deposited may be modified to make them compatible with a particular deposition method. For example, substituents such as alkyl and aryl groups, branched or unbranched, and preferably containing at least 3 carbons, may be used in small molecules to enhance their ability to undergo solution processing. Substituents having 20 carbons or more may be used, and 3-20 carbons is a preferred range. Materials with asymmetric structures may have better solution processability than those having symmetric structures, because asymmetric materials may have a lower tendency to recrystallize. Dendrimer substituents may be used to enhance the ability of small molecules to undergo solution processing.

Devices fabricated in accordance with embodiments of the present invention may further optionally comprise a barrier layer. One purpose of the barrier layer is to protect the electrodes and organic layers from damaging exposure to harmful species in the environment including moisture, vapor and/or gases, etc. The barrier layer may be deposited over, under or next to a substrate, an electrode, or over any other parts of a device including an edge. The barrier layer may comprise a single layer, or multiple layers. The barrier layer may be formed by various known chemical vapor deposition techniques and may include compositions having a single phase as well as compositions having multiple phases. Any suitable material or combination of materials may be used for the barrier layer. The barrier layer may incorporate an inorganic or an organic compound or both. The preferred barrier layer comprises a mixture of a polymeric material and a non-polymeric material as described in U.S. Pat. No. 7,968,146, PCT Pat. Application Nos. PCT/US2007/023098 and PCT/US2009/042829, which are herein incorporated by reference in their entireties. To be considered a "mixture", the aforesaid polymeric and non-polymeric materials comprising the barrier layer should be deposited under the same reaction conditions and/or at the same time. The weight ratio of polymeric to non-polymeric material may be in the range of 95:5 to 5:95. The polymeric material and the non-polymeric material may be created from the same precursor material. In one example, the mixture of a polymeric material and a non-polymeric material consists essentially of polymeric silicon and inorganic silicon.

Devices fabricated in accordance with embodiments of the invention may be incorporated into a wide variety of consumer products, including flat panel displays, computer monitors, medical monitors, televisions, billboards, lights for interior or exterior illumination and/or signaling, heads up displays, fully transparent displays, flexible displays, laser printers, telephones, cell phones, personal digital assistants (PDAs), laptop computers, digital cameras, camcorders, viewfinders, micro-displays, 3-D displays, vehicles, a large area wall, theater or stadium screen, or a sign. Various control mechanisms may be used to control devices fabricated in accordance with the present invention, including passive matrix and active matrix. Many of the devices are intended for use in a temperature range comfortable to humans, such as 18 degrees C. to 30 degrees C., and more preferably at room temperature (20-25 degrees C.), but could be used outside this temperature range, for example, from −40 degree C. to +80 degree C.

The materials and structures described herein may have applications in devices other than OLEDs. For example, other optoelectronic devices such as organic solar cells and organic photodetectors may employ the materials and structures. More generally, organic devices, such as organic transistors, may employ the materials and structures.

The terms halo, halogen, alkyl, cycloalkyl, alkenyl, alkynyl, aralkyl, heterocyclic group, aryl, aromatic group, and heteroaryl are known to the art, and are defined in U.S. Pat. No. 7,279,704 at cols. 31-32, which are incorporated herein by reference.

A modern personal workspace often may contain both a computer display and an illumination source such as a task lamp. The "desk top" in the workspace typically includes both real and virtual environments, each with differing requirements for lighting. For example, a real desktop is usually horizontal and illuminated by a variety of illumination sources, whereas a virtual "desktop," typically provided by one or more displays, is often self-illuminating and nearer to vertical. Often, both a display and an illumination source such as a luminaire will be turned on and at full brightness even though the user typically will use only one or the other at any given moment. Embodiments of the present invention may provide energy-saving systems and devices that incorporate a display or similar device and an illumination source that operate in coordination with each other and with a sensor that determines whether or not the user is looking at the display screen. For example, when the user is looking at the display, the display may be at fiull brightness or at an "in use" brightness setting and the luminaire may be automatically dimmed. Similarly, when the user looks away from the display, the display may dim and the luminaire may return to full brightness. In addition, the workspace may be illuminated by ceiling and/or overhead lighting that may be controlled with, or instead of, a task lamp or similar luminaire or other local illumination source.

More generally, the illumination available at a workstation may include light from many sources, such as a task lamp, general room illumination sources such as overhead lighting, and other ambient sources. Embodiments of the present invention may provide techniques and systems to maintain a specified light level at a work surface by adjusting one or more of these sources.

Example systems disclosed herein may include one or more lighting elements that can be controlled with sensor input and application lighting preferences. As a specific example, when a user receives a video call, a light may be activated to illuminate the user's face. Sensors can determine whether or not the user is currently looking at a display screen. When the user is looking at the display, the display will be at the brightness necessary for the lighting conditions. Such conditions may not require the display to be as bright as if the desk is fully illuminated (for, e.g., increased contrast). When the user looks away from the screen, the screen may dim further and the lighting elements may brighten, in some cases only in the direction of the user's attention. The lighting elements may include a task light or similar light source positioned relatively close to the workspace, overhead illumination such as ceiling or similar light sources, or combinations thereof.

As another example, a sensor may monitor the light level on a work surface. When the light sensor registers no other light sources are present at the surface, a controller may increase the level of illumination provided by a general illumination source such as an overhead light to a full brightness level, thus providing all of the light needed to maintain the light sensor's preset threshold. If another light source, such as daylight from a window or illumination from a task light, provides some light to the surface but not a level above the light sensor's threshold, the general room lights may be adjusted to provide just enough light to compensate. If a local task lamp is on and is providing enough light to reach the light sensor's threshold, the general room lights may dim to a minimum preset level, which could be at zero luminance.

Embodiments disclosed herein may save energy and allow for personalization of the lighting levels proximal to individual users, responding to their activities and adjusting the balance between light provided by a display, the light provided by an illumination source such as a personal desk light, and/or the light provided by a general room illumination source such as an overhead light.

Generally, embodiments disclosed herein can include several components: a display such as a computer display, an illumination source such as a task lamp or other local light source in proximity to the display, one or more sensors that can determine the level of light in a work area and/or the direction of a user's gaze, i.e., in which direction and/or where on a surface or other location the user is looking, a general room illumination source, and a control system such as one or more local controllers which can adjust the display and the illumination source, such as to independently raise and lower the brightness level of each, change the color temperature of each, or change the general coloring of the illumination source. For example, when the sensor determines the user is looking at the display, the controller may raise the brightness level of the display and lower the brightness level of the illumination source, and when the sensor determines that the user is not looking at the display, the controller may lower the brightness level of the display and raise the brightness of the light source.

The reaction time of the system, i.e., the rate of change at which the controller changes operation of the display and/or the illumination source, may have an effect on user comfort. For example, rather than dimming and brightening instantly as the user looks at and away from the display, it may be preferable for there to be a built-in delay. The delay may cause the intensity changes to be less jarring or even unnoticeable to the user. Different components may have different delays, i.e., different rates of change or delays before a change occurs. For example, when a user is looking at a display, the illumination source may not begin to dim for about a minute, after which the dimming may occur very slowly, for example over a 10 minute period, after which the source is at a minimum brightness. When the user then looks away from the display, the illumination source may brighten relatively quickly, but still may take at least 1 or 2 seconds to achieve full brightness. The dimming and brightening of the display may be less jarring and often may occur more quickly, but it may be preferable to have a delay of, for example, 30 seconds before the display begins to dim. Similarly, it may be preferred for the display to brighten relatively quickly, for example in less than 1 second.

OLED components may be particularly well-suited for the illumination components disclosed herein, but may also be used for a display. OLEDs provide an inherently low heat, no glare, and dimmable light source, allowing a component to be placed in close proximity to the user, and thus may provide a desirable source of task lighting. In configurations where a color-tunable OLED is used, an illumination source as disclosed herein may shift into the warmer, redder end of the spectrum when it dims. It is generally understood that people often prefer light sources that become warmer as they dim, such as incandescent bulbs and other blackbody radiators. This effect also may serve to increase the overall lifetime of the OLED since blue emitters, which typically have lower lifetimes than other emitters, would be conserved. Similarly, when a sensor detects that the user is not looking at the display, the display may dim. If the display is an OLED or similar display, the display also may reduce the color temperature of the display white point so as to further reduce power consumption and/or extend the display lifetime. Devices typically are designed to have a specific white point color temperature, which may be user-adjustable, commonly in the range of 6,000-10,000 K, which corresponds to bluish-white.

The rate of change, color temperature and color, and any other aspects of the illumination source and/or the display may be controlled by the controller, or they may be inherent to the components. For example, a controller may specify a brightness at which an illumination source is to operate, and a time over which the source should change state from a current state to the indicated brightness. Alternatively, the controller may send a simple instruction either to brighten or dim, or to operate at a specific brightness, at which point the illumination source may operate using built-in parameters to achieve the specified operation state.

An illumination source as disclosed herein may have various physical arrangements and properties. For example, the illumination source may include transparent and/or flexible components, and may be flexible and/or transparent as a whole. For example, a flexible task lamp may be used that can be positioned along a desired contour of a work area. The illumination source also may be physically connected to the display and/or other components of the system. For example, the illumination source may be configurable in a collapsed state, such as where it is folded into or against the display, and in an expanded state, in which it extends away from the display to provide illumination to a different region of a work area. The illumination source also may be relatively thin, for example, not more than 3 mm thick. More generally, illumination sources disclosed herein may have any energy profiles, physical dimensions, power requirements, and other attributes that are achievable for OLED and similar types of lighting systems. For example, PHOLED or other OLED devices may be used. A local task light as disclosed herein may have a peak intensity less than 5,000 $cd/m^2$ at any point on the emitting surface. It also may contain no hazardous materials, and may be capable of producing at least 50 lm/W at a CRI of 80 or more under normal operating conditions.

The four components may be arranged in different ways as shown in FIG. 3. Generally, unless disclosed herein, each component may communicate with any other component via any suitable wired or wireless connection and protocol. Typically, a controller 340 receives information from the sensor 320, and provides control information to, or otherwise controls, the display 310 and illumination source 330, for example as shown in FIG. 3. More generally, any other arrangement of information flow among the components may be used, and other intermediary components may be included. For example, where the display and/or sensor is integrated with a computing device, the computing device may receive information from the sensor and relay it to the controller, or it may receive control signals from the controller and relay appropriate control signals to the display and/or sensor.

As previously described, a controller may receive information from a gaze direction sensor that indicates a direction, region, or location at which a user is looking. Based upon this information, the controller may control the display, the illumination source, or both. The control may include changing the brightness of the display and/or illumination source, such as to dim the component not in use by the user. The control also may include changing the color temperature or apparent color of the component, such as to change the color temperature of light emitted by the illumination source or the display.

Figure 3A:
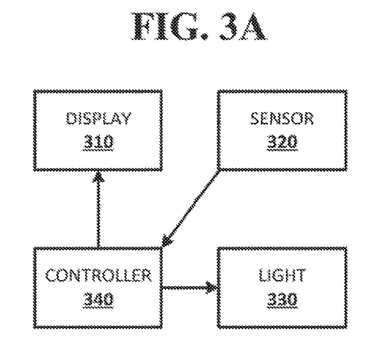
FIGS. 3A-3D shows example devices and arrangements for controlling electronic devices based upon a user's gaze according to embodiments of the invention.

FIG. 3A shows an example arrangement in which each component is physically separate. In such an arrangement, the controller 340 may control the display 310 and illumination source 330 based upon gaze direction information obtained by the sensor 320, which indicates where a user is looking. Although physically separate in the example shown in FIG. 3A, the components may be arranged in proximity to one another, including in direct physical contact. For example, the sensor 320 may include a camera that is placed on or attached to the display 310 or the illumination source 330.

Figure 3B:
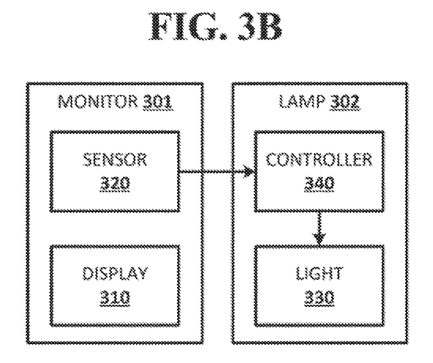

More preferably, the components may be combined in various ways. FIG. 3B shows an example configuration in which the sensor 320 is combined with the display 310 within a first device 301 such as a general purpose computer or a computer monitor, and the controller 340 is combined with the illumination source 330 in a second device 302 such as a luminaire. Although shown in a monitor and luminaire as an example arrangement, it will be understood that the devices 301 and 302 may be any suitable devices. Such arrangements may be useful to take advantage of existing components of these devices. For example, many displays include a built-in camera that may operate as the gaze direction sensor. Combining the controller with the illumination source in a device such as a lamp also may allow the user to easily override an automatic dimming or other change initiated by the controller. As previously described, the controller 340 may control the illumination source 330 based upon a signal from the sensor 320. In this example, the display 310 may be controlled by one or more other components within the device 301, or it may be controlled by the controller 340 within the second device 302.

Figure 3C:
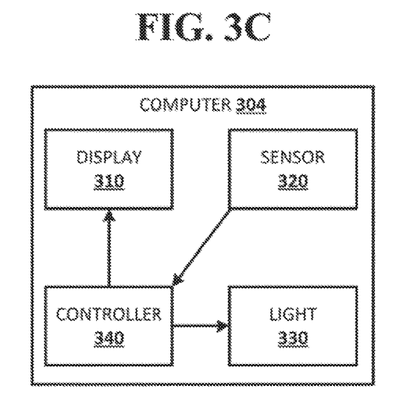

FIG. 3C shows an arrangement in which all the components are integrated within a single device 304, such as a general purpose computer. For example, the sensor may be implemented by a camera within the device 304, and may provide gaze direction information to a processor within the device as previously described. The processor may operate as the controller 340 to control a display 310 and illumination source 330. The display may be, for example, a conventional display of a general-purpose computer system. The illumination source may be, for example, a light contained within or disposed upon a housing of the device 304.

Figure 3D:
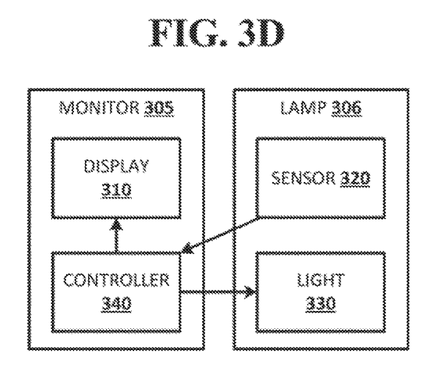

FIG. 3D shows another example configuration in which the display 310 and the controller 340 are implemented within one device 305, such as a computer monitor, and the sensor 320 and illumination source 330 are implemented within a second device, such as a lamp or other luminaire. Such a configuration may be useful to allow a user to obtain only a single new device, such as an illumination/sensor device 306, which can then interface with an existing computer, monitor, or other device 305 already owned by the user. The device 305 may be configured to provide functionality of the controller 340 and/or display 310 via, for example, software installed on or executed by a processor of the device 305.

FIGS. 3A-3D show specific examples of arrangements of the basic system components disclosed herein. However, any suitable arrangement of the components may be used without departing from the scope and content of the present disclosure.

In some configurations, there may be more than one of any of the components described herein. For example, in an embodiment a mobile phone or other device which includes a display and camera sensor could be wirelessly connected to the controller, or the controller could be connected to multiple luminaires. Such a system may allow for more precise tracking of the user's gaze, where multiple sensors are used to determine the direction of the user's gaze. As another example, a system which includes or controls multiple illumination sources may allow for control of ambient or other lighting within a larger area such as a room having multiple luminaires as disclosed herein, or the like.

Figure 4A:
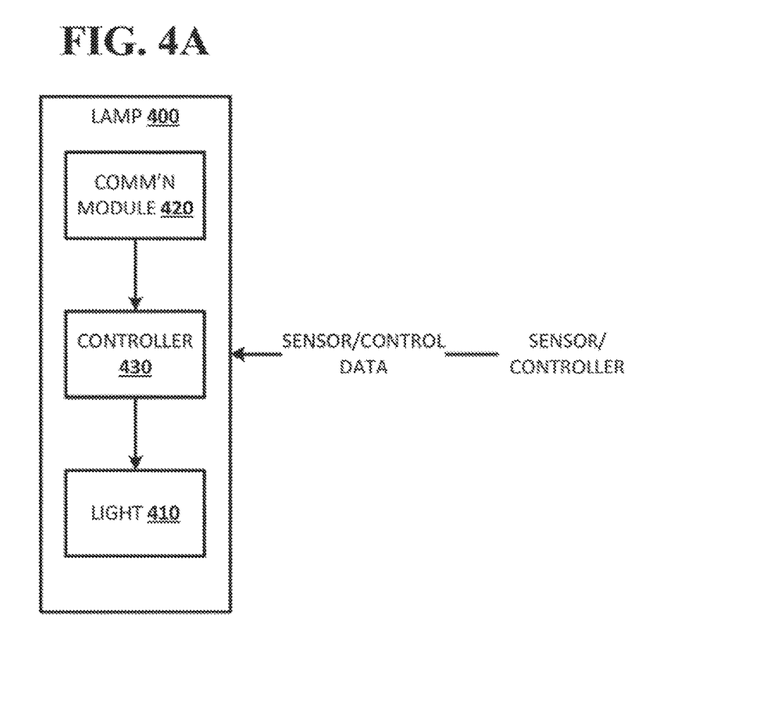
FIGS. 4A-4B show example devices according to embodiments of the invention.

FIG. 4A shows a schematic representation of an example illumination source 400 as disclosed herein, such as a task lamp or other luminaire. The luminaire includes an illumination source 410 and a communication module 420 which may receive information from an external sensor and/or controller. The information may be provided to a controller 430, which may then control the illumination source as previously disclosed. Alternatively or in addition, the illumination source 410 may be controlled directly by an external controller, or primarily by an external controller operating via a local controller 430. Multiple controllers and/or sensor signals may be received by the luminaire and used to control the illumination source. As previously described, the luminaire also may include one or more sensors, such as a gaze direction sensor, to determine a direction or region at which the user is looking. The illumination source 410 may be an OLED or any other suitable light-emitting component as previously described.

Figure 4B:
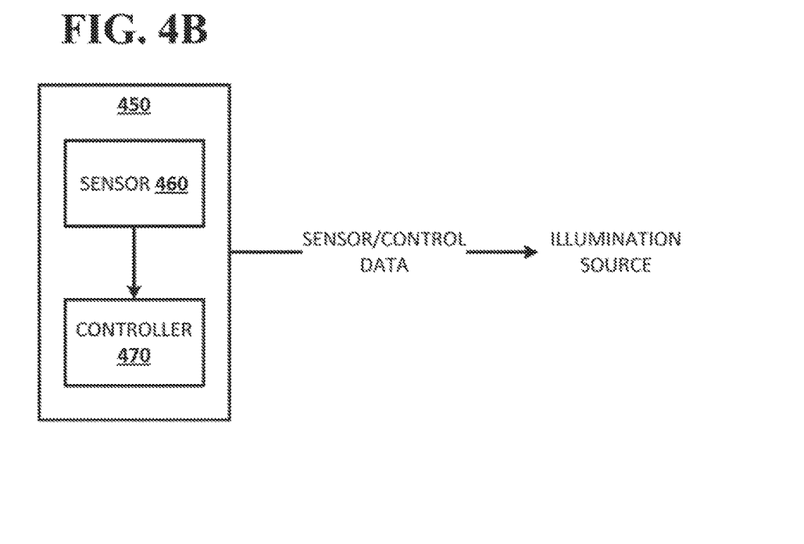

FIG. 4B shows an example device 450 that includes a gaze direction sensor 460 and a controller 470. The device 450 may be, for example, a camera that is external to a display and/or an illumination source, a camera that is integrated with a display or other device, a portable computing device such as a mobile phone, or the like. As previously described, the controller may provide information to, and/or directly control, an illumination source that is physically separate from the device 450. The device 450 also may include a display, communication module, and other components as previously described.

Figure 5:
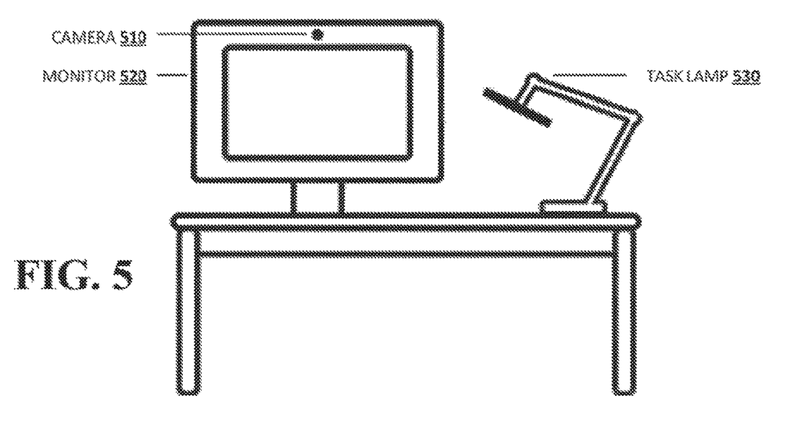
FIG. 5 shows an example of a workspace including lighting systems according to an embodiment of the invention.
Figure 6:
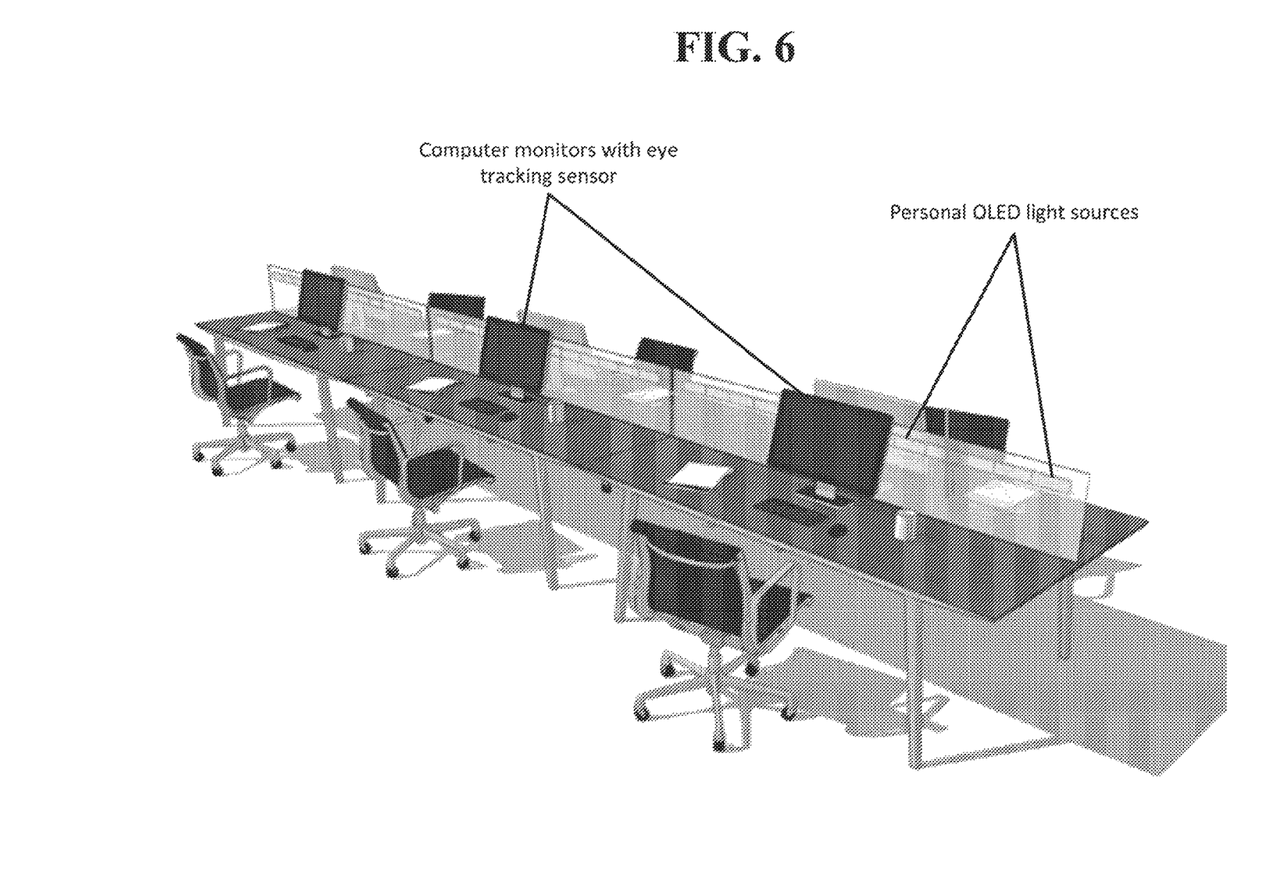
FIG. 6 shows an example of multiple workspaces including lighting systems according to an embodiment of the invention.

FIG. 5 shows an example arrangement of a system disclosed herein at a user workstation. The system includes a camera 510 that is integrated with a computer monitor 520 and a task lamp 530. As previously described, the camera may obtain user gaze direction information, which is then used to control the monitor 520 and task lamp 530. Each of the monitor 520 and task lamp 530 may be controlled in any manner described herein, including by adjusting the brightness of each, alone or in tandem, changing the color temperature, and so on. FIG. 6 shows an arrangement that includes multiple workstations such as shown in FIG. 5, with each having an associated monitor and task light in the form of OLED light sources. Notably, each workstation may have one or more illumination sources that is linked to the monitor and sensor for that workstation, such that the illumination sources respond only to gaze direction information from the appropriate sensor.

The examples described above with respect to FIGS. 3-6 are provided in terms of a gaze direction sensor and a display operating in conjunction with one or more sources of illumination. More generally, a sensor such as a light level sensor may operate in conjunction with a controller and one or more illumination sources as previously described, to maintain a desired level of illumination at a particular location, such as a work surface.

Figure 7:
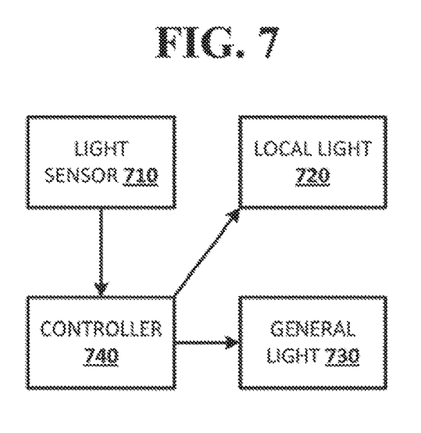
FIG. 7 shows an example schematic representation of a system including a controller and multiple illumination sources according to an embodiment of the invention.

In an embodiment, a system may include a general room illumination source such as one or more ceiling or other overhead lights, a local illumination source such as a desk lamp or other task light, a light sensor, and a controller that can communicate with and control the general illumination source and the local illumination source. FIG. 7 shows an example schematic representation of such a system. As with the other example systems shown, it will be understood that each light may include a separate controller that communicates with other controllers and/or a sensor, or the system may include a single controller that communicates with and controls multiple illumination sources. In the example system shown in FIG. 7, a sensor 710 may detect the level of light present in a specific area, such as a work surface. The sensor may be configured to send a signal to a controller 740 if the level of illumination in the area exceeds a threshold, or it may merely provide an indication of the level of illumination in the area to the controller. The controller 740 may determine a level of illumination for one or more of the local and general lights 720, 730, respectively, to maintain a desired level of illumination in the area monitored by the sensor 710. Thus, for example, if a user has indicated that the monitored area should be maintained at an illumination of 200 lux and the local light 720 is providing 150 lux, the controller may adjust the general illumination light to a level at which 50 lux is provided to the monitored area, i.e., so that the total level detected by the sensor 710 is 200 lux. The sensor also may measure the light exitance of the work surface, rather than measuring the illumination directly. Such a configuration may be desirable, for example, to allow the light sensor to be incorporated into a general room illumination luminaire rather than being placed directly on the work surface, from where it can measure the light reflected from the work surface. This measurement may then be used as the measurement of the level of illumination in the monitored area, i.e., at the work surface.

It may be desirable for the local light 720 and other task lights disclosed herein to use OLED technology. Because of the properties of OLED lighting (e.g., cool to touch, no glare and pleasing spectrum and light quality) OLED luminaires can be used to provide more local light than other technologies—this means that less light is required from the fixture luminaires, and so this approach may provide the greatest energy savings. As described in further detail herein, the use of OLED luminaires and other components may provide up to a 50% system energy savings can be preferably realized by OLED task lighting and none of this is discussed in the '552 application. We provide support in the submitted calculations.

Figure 8:
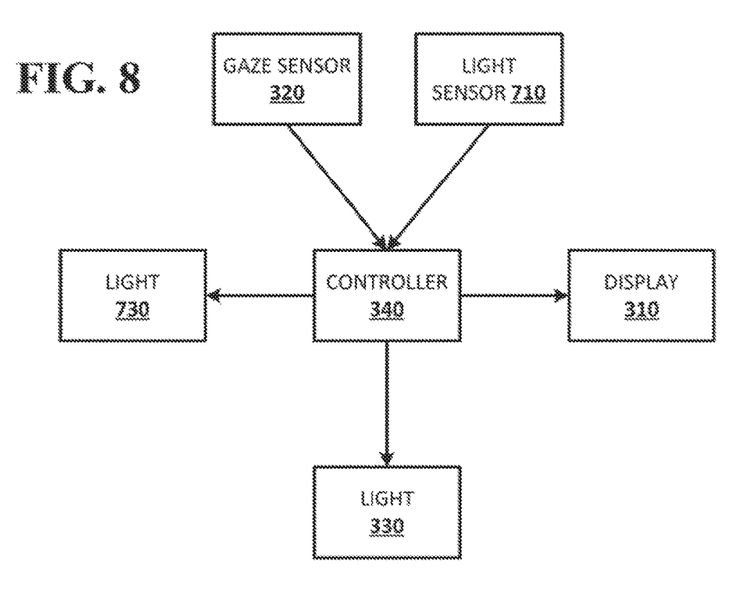
FIG. 8 shows an example system that includes a gaze sensor and an illumination level sensor according to an embodiment of the invention.

The system shown in FIG. 7 also may include a gaze sensor as previously described. Thus, the level of light in a monitored area such as a work surface may be set at one level when a user is looking at the work surface, and another level when the user is looking away from the work surface, such as toward a display as previously described. The level of illumination provided in a monitored area may be set by the user, or it may be predetermined. An example system that includes a gaze sensor and an illumination level sensor is shown in FIG. 8. As previously described, the gaze sensor 320 may determine the direction of a user's gaze and communicate related information to the controller 340. Similarly, an illumination level sensor 710 may detect the level of light in an area such as the work surface as previously described, and communicate related information to the controller 340. The controller may then set appropriate illumination levels of one or more lights 330, 730 and/or a display 310, as previously described. The controller may be a physically-separate device, or it may be integrated with the display, a computer, a lighting system, a light switch, or other component as previously described. Similarly, each of the sensors 320, 710 may be incorporated into another component of the system, such as a local task lamp or other local illumination source, a general room illumination luminaire, a display, a computer system, or the like.

Figure 9:
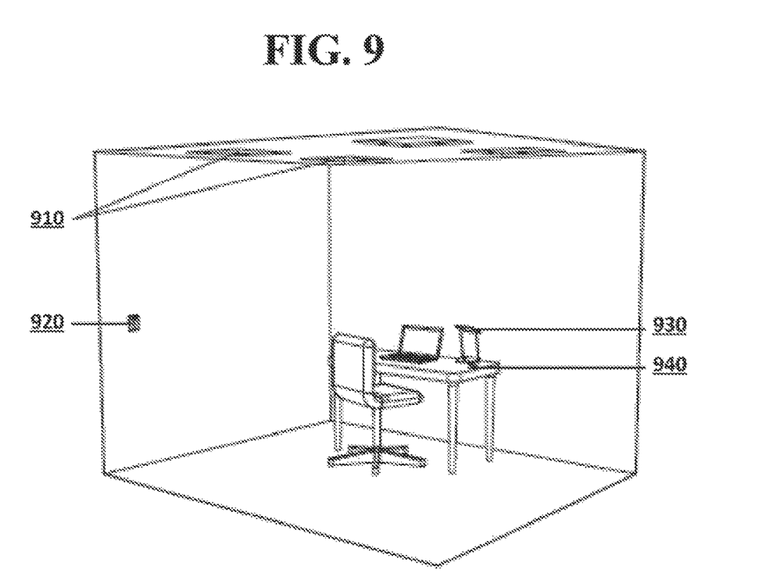
FIG. 9 shows a perspective view of a room that includes a system according to an embodiment of the invention.

FIG. 9 shows a perspective view of a room that includes a system according to an embodiment of the invention. The room may include one or more general illumination sources 910, a task light 930, a sensor 940, and a light switch 920. As previously disclosed, one or more of the light switch 920 and lighting components 910, 930 may include a controller that adjusts the level of illumination provided by each lighting component 910, 930 based upon data received from the sensor 940.

Embodiments of the invention may be implemented as components suitable for interfacing with, or augmenting, existing lighting systems. For example, in an embodiment, a system may incorporate existing general and task lighting. A small wireless light sensor may be placed on the user's desk and a replacement wall switch or controller that controls the general room lighting may be installed in a room, such as in an existing light switch wall receptacle. The light sensor may have relatively very low power requirements, so that it may be powered by, for example, ambient light through the incorporation of photovoltaic cells, and thus require little or no user maintenance and/or external wired connections.

Systems and devices as disclosed herein also may adjust illumination levels of one or more illumination sources to achieve certain levels relative to one another. For example, the system may adjust a general illumination source such that, when a local task light is on, the general illumination source is operated at a level that is not more than 50% of the illumination intensity at which it is operated when the task light is turned off. Similarly, the system may be configured that when the task lighting is on, the energy consumption of the overall system (task lighting plus general illumination) is less than 50% of the energy consumption compared to when the task lighting is turned off.

Many work areas, such as offices and work rooms, use non-dimmable fluorescent lights. In an embodiment, a wireless light sensor may be paired with dimmable retrofit general illumination lights such as LED lights. The LED lights may replace fluorescent luminaires, (troffers), or they may be tubular linear LED lamps that fit into existing troffers and replace only the florescent tube. The advantage of tubular LED lamps is that the user would not need to do anything complicated such as installing new wiring to complete a retrofit installation, merely replace existing fluorescent tubes with the LED tubes and place the wireless sensor on their desk. However, tubular LEDs may not be as efficient as replacement LED troffers.

In an embodiment, OLED luminaires such as task lamps and LED ceiling lights designed for new construction, rather than retrofitting, may be used. Such systems may operate in a similar fashion to those described, but may be more desirable for new construction or in situations where new lighting systems are being installed.

Communications other than those specifically described may be performed between the sensors, controller, and/or illumination sources. For example, in an embodiment, a task light or other local illumination source may communicate with a general illumination source, directly or via a controller, to inform the general illumination source that the task light is turned on. Thus it may be determined whether the task light is operational, and the general illumination source may adjust its own output based on this communication. Similarly, a controller may receive information regarding the operational status of one or more illumination sources, including local lights, general room lights, specialty-purpose lights, and the like, and adjust the output of one or more of the illumination sources to achieve a desired illumination level in a monitored area.

It may be possible to implement the light sensor and other components disclosed herein using relatively low power communications. For example, an illumination level sensor as disclosed may be operable using a low-power wireless communication protocol such as Bluetooth® or a similar technique. The sensor also may be powered by an embedded solar cell and/or internal battery. A low-power Bluetooth® transmitter requires approximately 45 µJ per transmission burst. A 1 $cm^2$ solar cell operating at 10% efficiency can produce approximately 0.04 mW at 500 lux illumination. Thus, a solar cell should provide sufficient energy to allow approximately 1 transmission burst each second.

Notably, the use of a relatively small, physically-distinct light sensor may be more desirable than configurations in which a sensor may be integrated with a task lamp or other component. In a configuration in which the sensor is separate, it may record the light incident on a surface of interest, including any light from the task lamp. Embodiments of the present invention may maximize energy savings by reducing general room illumination fixture lighting dependent on light coming from other sources such as daylight or a task lamp, as the fixture lighting typically has the lowest application efficiency due to its larger distance from the work surface and therefore typically is the least efficient. Thus, it may be desirable to rely primarily on the local task lighting to reduce the need for the use of lower efficiency fixture lighting.

Figure 10:
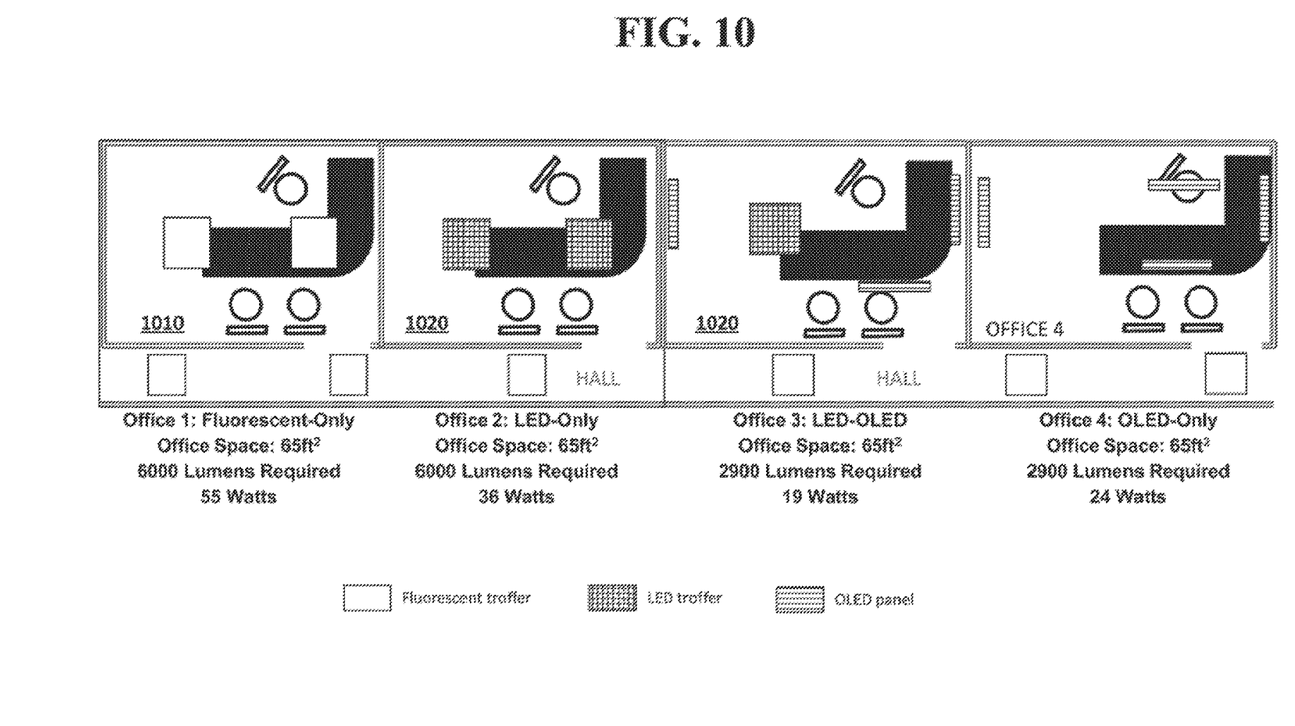
FIG. 10 shows illustrative room arrangements and associated energy calculations for different lighting configurations according to an embodiment of the invention.

Embodiments disclosed herein may provide for additional energy use reductions. For example, FIG. 10 shows illustrative room arrangements and associated energy calculations for configurations that use all fluorescent lamps, LED-only lamps, LED/OLED lamps and only OLED lamps. One office 1010 includes all fluorescent lighting. A second office 1020 includes ceiling illumination. A third office 1030 includes LEDs that provide ceiling illumination and OLEDs used as task lighting and placed closer to a user. Finally, in Office 4 4040 the OLED lighting is used both as ceiling lighting and task lighting. As shown, the OLED and LED/OLED configurations are expected to provide equivalent illumination at a much lower energy expenditure.

It is understood that the various embodiments described herein are by way of example only, and are not intended to limit the scope of the invention. For example, many of the materials and structures described herein may be substituted with other materials and structures without deviating from the spirit of the invention. The present invention as claimed may therefore include variations from the particular examples and preferred embodiments described herein, as will be apparent to one of skill in the art. It is understood that various theories as to why the invention works are not intended to be limiting.

The invention claimed is:

1. A luminaire comprising:
a communication module configured to receive a first signal from a first external device, the first signal indicating a direction of a gaze of a user, wherein the first external device is external to the luminaire;
at least one illumination source; and
a controller configured to control the illumination source based upon the first signal and based upon a second signal received from a second external device that is physically separate from the first external device and is external to the luminaire, wherein the second external device is a light sensor which is communicatively coupled to the communication module, and the second signal indicates that a level of illumination in an area exceeds a threshold value.

2. The luminaire of claim 1, further comprising a sensor configured to determine the gaze of the user.

3. The luminaire of claim 1, wherein the illumination source comprises an organic light emitting device.

4. The luminaire of claim 1, wherein the first external device is a mobile computing device.

5. The luminaire of claim 1, wherein the communication module is in wireless communication with the first external device.

6. The luminaire of claim 1, wherein the illumination source is color-tunable, and wherein the controller is configured to control the color of light emitted by the illumination source in response to the first signal.

7. The luminaire of claim 1, wherein the at least one illumination source comprises a plurality of illumination sources.

8. The luminaire of claim 1, wherein the illumination source is transparent, flexible, or both transparent and flexible.

9. A device comprising:
a gaze direction sensor configured to determine a gaze direction of a user; and
a controller configured to control at least one external illumination source based upon the gaze direction and based upon a signal received from an external device that is physically separate from and external to the device, wherein the external device is a light sensor which is communicatively coupled to the controller, and the signal indicates that a level of illumination in an area exceeds a threshold value;
wherein the external illumination source is physically separate from the device.

10. The device of claim 9, wherein the device is a portable computing device.

11. The device of claim 9, wherein the gaze direction sensor comprises a camera.

12. The device of claim 9 further comprising a wireless communication module configured to provide a control signal from the controller to the external illumination source.

13. The device of claim 9, wherein the at least one external illumination source comprises a plurality of illumination sources.

* * * * *